(12) United States Patent
Chen et al.

(10) Patent No.: US 9,122,553 B2
(45) Date of Patent: Sep. 1, 2015

(54) SYNCHRONOUS BUS DOWNLOAD OF TV SOFTWARE UPDATE

(75) Inventors: Wanhua Chen, San Marcos, CA (US); Natalia Ariadna Manea, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 2049 days.

(21) Appl. No.: 12/015,069

(22) Filed: Jan. 16, 2008

(65) Prior Publication Data

US 2009/0144715 A1    Jun. 4, 2009

Related U.S. Application Data

(60) Provisional application No. 61/004,889, filed on Dec. 1, 2007.

(51) Int. Cl.
*G06F 9/44* (2006.01)
*G06F 9/445* (2006.01)

(52) U.S. Cl.
CPC ........................................ *G06F 8/65* (2013.01)

(58) Field of Classification Search
CPC ........................................................ G06F 8/65
USPC ........................................................ 717/173
See application file for complete search history.

(56) References Cited

U.S. PATENT DOCUMENTS

| 4,615,017 | A | * | 9/1986 | Finlay et al. ................. 713/400 |
| 5,949,493 | A | * | 9/1999 | Mudra et al. ................. 348/553 |
| 5,958,024 | A | * | 9/1999 | Typaldos et al. .............. 710/26 |
| 6,615,404 | B1 | * | 9/2003 | Garfunkel et al. ........... 717/173 |
| 7,366,824 | B2 | * | 4/2008 | Chiang ........................ 711/100 |
| 7,425,992 | B2 | * | 9/2008 | Feeler et al. ................. 348/553 |
| 7,818,737 | B2 | * | 10/2010 | Shin et al. .................... 717/168 |
| 2004/0080334 | A1 | * | 4/2004 | Vergnes ........................ 326/10 |
| 2004/0244008 | A1 | * | 12/2004 | Lee ............................... 719/310 |
| 2005/0120384 | A1 | * | 6/2005 | Stone et al. ................... 725/132 |
| 2005/0240919 | A1 | * | 10/2005 | Kim et al. ..................... 717/168 |
| 2006/0034266 | A1 | * | 2/2006 | Harris et al. .................. 370/356 |
| 2006/0101461 | A1 | * | 5/2006 | Han .............................. 717/174 |
| 2006/0130046 | A1 | * | 6/2006 | O'Neill ........................ 717/168 |
| 2006/0218309 | A1 | * | 9/2006 | Young et al. ................. 710/8 |
| 2007/0006210 | A1 | | 1/2007 | Shin et al. |
| 2007/0055970 | A1 | * | 3/2007 | Sakuda et al. ............... 717/168 |
| 2007/0169078 | A1 | * | 7/2007 | Li .................................. 717/168 |
| 2007/0261046 | A1 | * | 11/2007 | Miller .......................... 717/168 |

FOREIGN PATENT DOCUMENTS

CN    1885921 A    12/2006

* cited by examiner

*Primary Examiner* — Don Wong
*Assistant Examiner* — Theodore Hebert
(74) *Attorney, Agent, or Firm* — John L. Rogitz

(57) ABSTRACT

TV software can be updated by receiving updated from a USB drive or wirelessly, in either case preferably over a synchronous bus for speedier data transfer.

19 Claims, 2 Drawing Sheets

SYNCHRONOUS BUS DOWNLOAD OF TV SOFTWARE UPDATE

Priority is claimed from U.S. provisional patent application 61/004,889, filed Dec. 1, 2007.

FIELD OF THE INVENTION

The present invention relates generally to downloading software updates to TVs wirelessly or from a universal serial bus (USB) drive over a synchronous bus.

BACKGROUND

Televisions have become increasingly advanced, providing viewers with ever more control and viewing options. As but one example, electronic program guides (EPG) can be displayed on a TV in response to a command generated by a remote control device, with the EPG showing a channel listing and show descriptions. As another example, TV processors may execute code to control the drivers of TV displays for improving picture presentation, and may also execute backend code for undertaking advanced functionalities.

As understood herein, the code executed by the TV processors may require updating from time to time, and it would be desirable to provide a convenient, simple, and fast way to do so, speed being desired to minimize the chance of interrupted data transmission.

SUMMARY OF THE INVENTION

A method includes establishing communication on a synchronous serial bus in a TV between a tangible computer readable medium storing code and a source of updated code. The method includes downloading the updated code over the synchronous serial bus from the source to the tangible computer readable medium for subsequent execution thereof by a TV chassis processor.

The source can be a wireless source or it may be a universal serial bus (USB) drive that can be removably engageable with the TV. The TV can also include an asynchronous serial bus. In non-limiting implementations the synchronous serial bus is a serial peripheral interface (SPI) bus and the asynchronous serial bus is a universal asynchronous receiver transmitter (UART) serial bus.

If desired, the method may include, on a block by block basis, determining whether a block of the updated code has been successfully copied into the tangible computer readable medium and whether the TV is ready for the next block, and only if so, downloading the next block from the source.

In another aspect, a TV system includes a TV chassis processor in a TV chassis supporting a TV display. A tangible computer readable medium is in the chassis and bears software code for execution thereof by the TV chassis processor. A TV processor is also provided, and a synchronous bus is in the chassis, with the tangible computer readable medium communicating with the bus. An interface receives updates to the software code. The TV processor causes the updates to be sent from the interface over the synchronous bus to the tangible computer readable medium.

In still another aspect, a TV includes a TV chassis supporting a TV display and a tangible computer readable medium. Also, a TV chassis processor is configured to execute code stored on the tangible computer readable medium. An interface receives updates to the code and provides the updates to the tangible computer readable medium over a synchronous serial bus.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
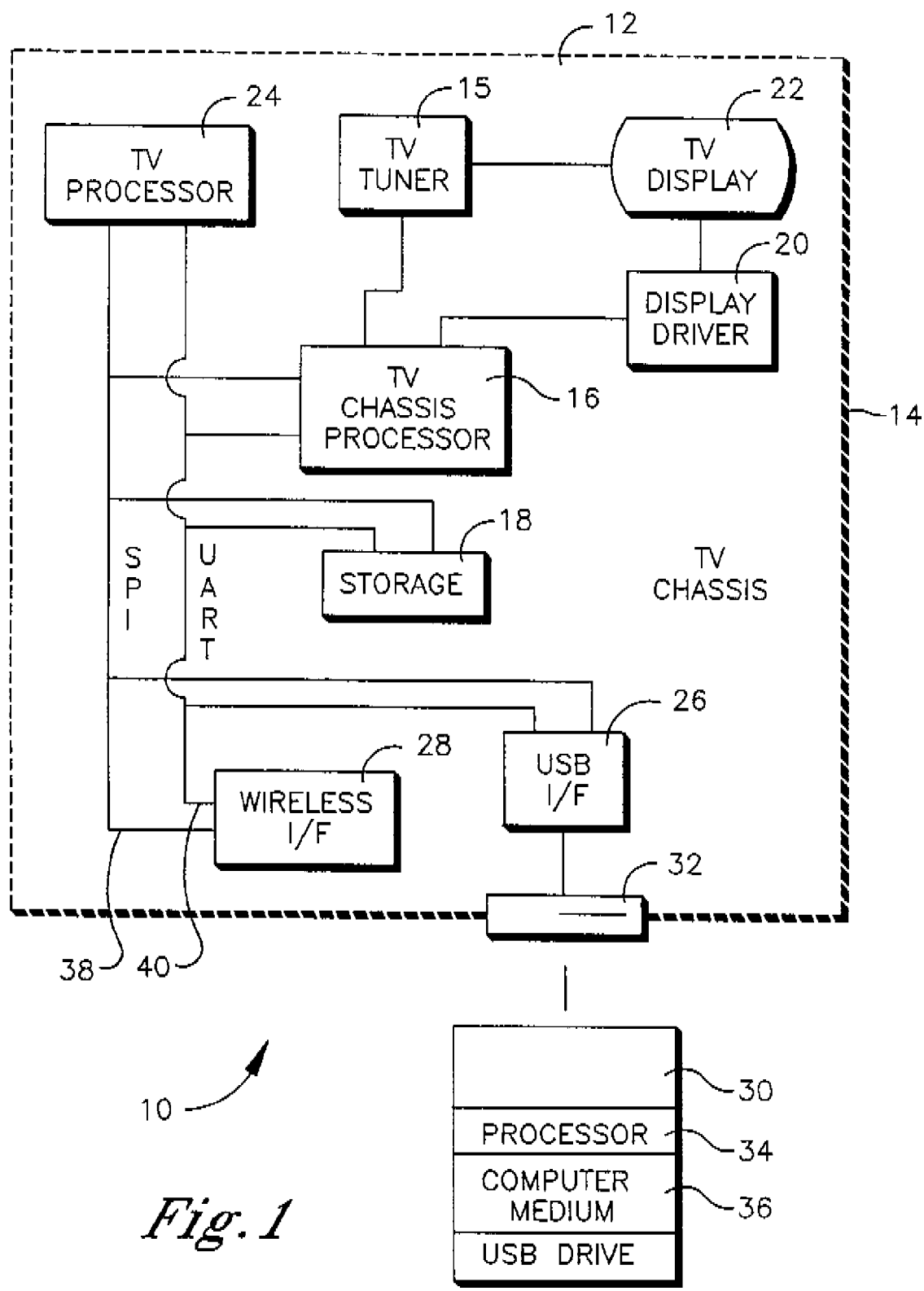
FIG. 1 is a non-limiting block diagram of a system in accordance with present principles.

Referring initially to FIG. 1, a system is shown, generally designated 10, which includes a television 12 defining a TV chassis 14 and receiving, through a TV tuner 15 from a set-top box (STB) or cable or satellite or other source or sources audio video TV programming. The TV 12 typically includes a TV chassis processor 16 accessing a tangible computer readable medium 18. The tangible computer readable medium 18 may be established by, without limitation, solid state storage, optical or hard disk storage, etc. The medium 18 may store updatable software executable by the TV chassis processor 16 to, e.g., control a display driver 20 that drives a TV display 22 such as well a flat panel matrix display, cathode ray tube, or other appropriate video display. The medium 18 may also contain additional code including backend software executable by the chassis processor 16 for various non-limiting tasks.

In some implementations, a second processor, referred to herein as a TV processor 24, may be provided in addition to the TV chassis processor 16. Among other tasks, the TV processor 24 may control a universal serial bus (USB) interface 26 and a wireless communication interface 28. The USB interface 26 may be engaged with a USB drive 30 using, for example, a portable USB drive connector 32, in which case it will readily be appreciated that the USB drive 30 is a portable device that can be removably engaged with the connector 32. The USB drive 30, which typically includes a USE processor 34 and a USB computer readable medium 36, may be implemented by a Sony Memory Stick® or other suitable device.

Either one or both of the above-described processors may execute the logic below. In one embodiment the TV processor 24 executes the software update download to update code in the medium 18 for subsequent execution of the updated code by the IV chassis processor 16.

As shown in FIG. 1, the components described above may communicate over two different buses, namely, a synchronous serial bus 38 and an asynchronous serial bus 40. In one implementation the synchronous serial bus 38 is a serial peripheral interface (SPI) bus while the asynchronous serial bus 40 is a universal asynchronous receiver transmitter (UART) serial bus.

Figure 2:
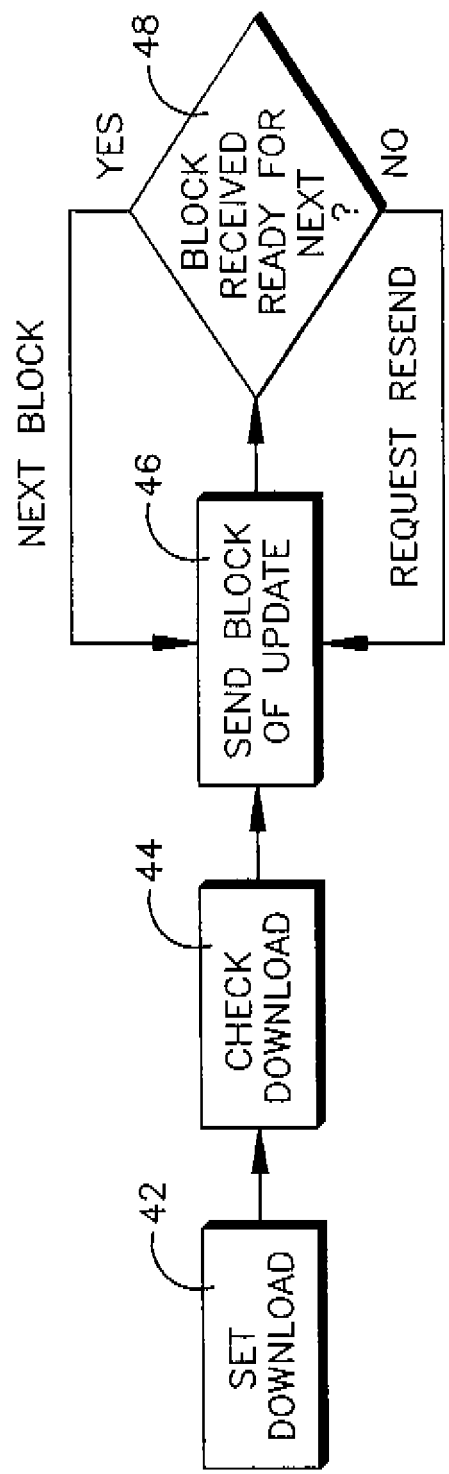
FIG. 2 is a flow chart of non-limiting logic in accordance with principles herein.

Now referring to FIG. 2, commencing at block 42 a download condition is set. The condition may be set by the TV processor 24 detecting the USB drive 30 and information thereon indicating that the USB drive 30 contains update to code. Or, the condition may be set by the TV processor 24 receiving a signal from the wireless interface 28 that it in turn has received an update signal from an external wireless source.

At block 44 the TV processor 24 determines whether the update is for code in the medium 18, and if so, begins the update process at block 46, wherein the first block of the updated code is downloaded from, e.g., the USB drive 30 by, e.g., the TV processor 24 to the medium 18. The download occurs over the synchronous serial bus 38, which, as recognized herein, typically permits faster data transfer than the asynchronous bus 40. In non-limiting implementations, after a block is downloaded the TV processor 24 determines, at decision diamond 48, whether the block was successfully copied into the memory 18 and whether the memory 18/TV chassis processor 16 is ready to receive the next block. If so, the process loops back to block 46 to download the next block, but otherwise a retransmission of the current block is requested. The process continues until the entire update has been downloaded to the memory 18.

While the particular SYNCHRONOUS BUS DOWNLOAD OF TV SOFTWARE UPDATE is herein shown and described in detail, it is to be understood that the subject matter which is encompassed by the present invention is limited only by the claims.

What is claimed is:

1. A method comprising:
    establishing communication on a synchronous serial bus in a TV between a TV chassis tangible computer readable medium storing code and an interface receiving updated code from a source of updated code, both the TV chassis tangible computer readable medium and the interface being directly connected to the synchronous serial bus such that no intervening processing components are disposed between the TV chassis tangible computer readable medium and the synchronous serial bus or between the synchronous serial bus and the interface;
    establishing communication on an asynchronous serial bus in the TV between the TV chassis tangible computer readable medium storing code and the interface receiving updated code from the source of updated code such that the interface and medium storing code are both connected to the asynchronous bus and synchronous bus simultaneously, both the TV chassis tangible computer readable medium and the interface being directly connected to the asynchronous serial bus such that no intervening processing components are disposed between the TV chassis tangible computer readable medium and the asynchronous serial bus or between the asynchronous serial bus and the interface; and
    downloading from the interface to the tangible computer readable medium the updated code received by the interface from the source, the downloading of the code from the interface to the tangible computer readable medium occurring over only the synchronous serial bus, the code being stored on the tangible computer readable medium for subsequent execution thereof by a TV chassis processor and not downloading the code over the asynchronous bus from the interface to the tangible computer readable medium.

2. The method of claim 1, wherein the source is a wireless source.

3. The method of claim 1, wherein the source is a universal serial bus (USB) drive.

4. The method of claim 3, wherein the USB drive is removably engageable with the TV.

5. The method of claim 1, wherein the TV also includes an asynchronous serial bus.

6. The method of claim 5, wherein the synchronous serial bus is a serial peripheral interface (SPI) bus and the asynchronous serial bus is a universal asynchronous receiver transmitter (UART) serial bus.

7. The method of claim 1, comprising: on a block by block basis, determining whether a block of the updated code has been successfully copied into the tangible computer readable medium and whether the TV is ready for the next block, and only if so, downloading the next block from the source.

8. A TV system, comprising:
    a TV chassis processor in a TV chassis supporting a TV display;
    a tangible computer readable medium in the chassis and bearing software code for execution thereof by the TV chassis processor;
    a TV processor;
    a synchronous bus in the chassis, the tangible computer readable medium communicating directly with the synchronous bus;
    an asynchronous bus in the chassis, the tangible computer readable medium communicating directly with the asynchronous bus; and
    an interface receiving updates to the software code, the TV processor causing the updates to be sent from the interface over the synchronous bus to the tangible computer readable medium but not sent over the asynchronous bus to the tangible computer readable medium, wherein the interface and medium are both connected to the asynchronous bus and synchronous bus simultaneously.

9. The system of claim 8, wherein the interface is a wireless interface.

10. The system of claim 8, wherein the interface is a universal serial bus (USB) interface.

11. The system of claim 10, wherein the USB interface communicates with a USB drive removably engageable with the TV.

12. The system of claim 8, wherein the synchronous serial bus is a serial peripheral interface (SPI) bus and the asynchronous serial bus is a universal asynchronous receiver transmitter (UART) serial bus.

13. The system of claim 8, wherein the TV processor, on a block by block basis, determines whether a block of the updated code has been successfully copied into the tangible computer readable medium and whether the tangible computer readable medium is ready for the next block, and only if so, downloading the next block from the interface.

14. A TV, comprising:
    a TV chassis supporting a TV display;
    a tangible computer readable medium in the chassis;
    a TV chassis processor configured to execute code stored on the tangible computer readable medium; and
    an interface receiving updates to at least portions of the code and providing the updates to the tangible computer readable medium over a synchronous serial bus, the interface also communicating with the tangible computer readable medium over an asynchronous bus and not using the asynchronous bus to provide the updates to the tangible computer readable medium, wherein the interface and medium are both connected to the asynchronous bus and synchronous bus simultaneously.

15. The TV of claim 14, wherein the code is display driver control code.

16. The TV of claim 14, wherein the code is backend code.

17. The TV of claim 14, wherein the bus is an SPI bus.

18. The TV of claim 17, wherein the interface is a USB interface.

19. The TV of claim 17, wherein the interface is a wireless communication interface.

* * * * *